United States Patent [19]

Lancaster et al.

[11] Patent Number: 4,564,732

[45] Date of Patent: Jan. 14, 1986

[54] DOVETAIL BASE ASSEMBLY FOR KEYSWITCHES

[75] Inventors: Eldon R. Lancaster, Anaheim; Manual T. Guest, Temple City; Robert W. Bessire, Anaheim, all of Calif.

[73] Assignee: Hi-Tek Corporation, Garden Grove, Calif.

[21] Appl. No.: 661,888

[22] Filed: Oct. 18, 1984

Related U.S. Application Data

[63] Continuation of Ser. No. 379,961, May 19, 1982, abandoned.

[51] Int. Cl.⁴ ............................................. H01H 9/02
[52] U.S. Cl. .................................... 200/307; 200/293; 403/381; 248/223.4
[58] Field of Search ............... 200/293, 294, 303, 307, 200/295; 400/472, 479, 479.1, 479.2; 403/381, 249, 251, 278; 220/23.2, 23.4, 345, 352, 353, 356; 248/223.4, 224.1, 224.2

[56] References Cited

U.S. PATENT DOCUMENTS

| | | | |
|---|---|---|---|
| 3,286,070 | 11/1966 | Völker | 200/307 |
| 3,589,758 | 6/1971 | King | 248/224.1 X |
| 3,599,212 | 7/1971 | Rhyne | 403/381 |
| 3,751,618 | 8/1973 | Hallerberg | 200/159 R |
| 3,851,936 | 12/1974 | Muller | 220/23.4 |
| 3,900,712 | 8/1975 | Fukao | 200/295 |
| 4,019,298 | 4/1977 | Johnson, IV | 403/381 |
| 4,095,913 | 6/1978 | Petterson et al. | 217/96 |
| 4,224,484 | 9/1980 | Haas et al. | 200/307 X |
| 4,267,417 | 5/1981 | Koepke | 200/307 |

FOREIGN PATENT DOCUMENTS

| | | | |
|---|---|---|---|
| 1490324 | 2/1972 | Fed. Rep. of Germany. | |
| 2516527 | 9/1977 | Fed. Rep. of Germany. | |
| 2386899 | 12/1978 | France | 200/307 |
| 613413 | 6/1978 | U.S.S.R. | 200/303 |

Primary Examiner—Stephen Marcus
Assistant Examiner—Ernest G. Cusick
Attorney, Agent, or Firm—Knobbe, Martens, Olson & Bear

[57] ABSTRACT

The modular structural base assembly is provided for constructing a custom key switch array which includes a foundation structural base module and a grouped keyswitch station arranged similarly to a typewriter key matrix. Accessory base modules of various keyswitch groupings are provided for attachment to the foundation module to permit addition of accessory keys at virtually any location and in any desired plurality. Accessory modules are coupled to the foundation module by a tongue-and-groove type connector which includes means for effectuating an interference fit to interlock adjacent modules. The tongue-and-groove couplers preferably have a dovetail shaped configuration.

14 Claims, 19 Drawing Figures

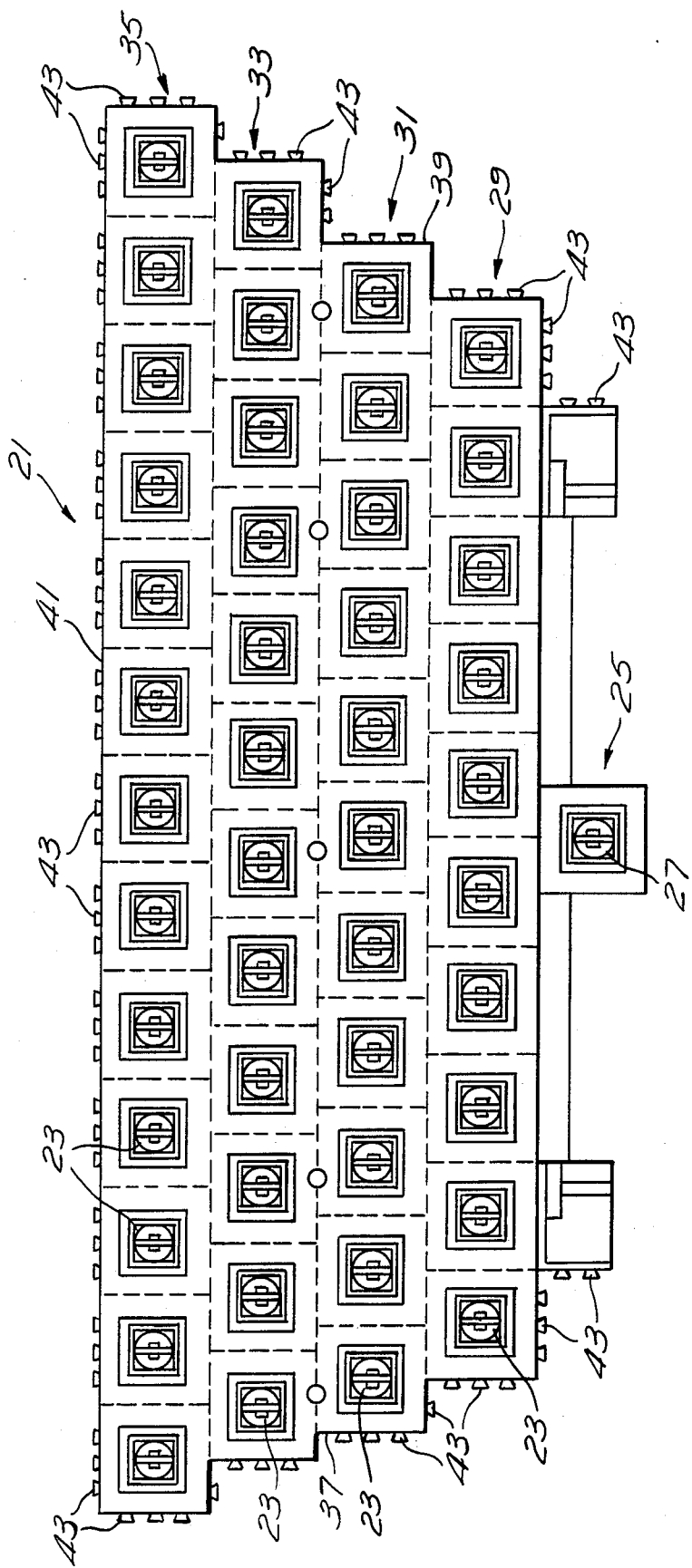

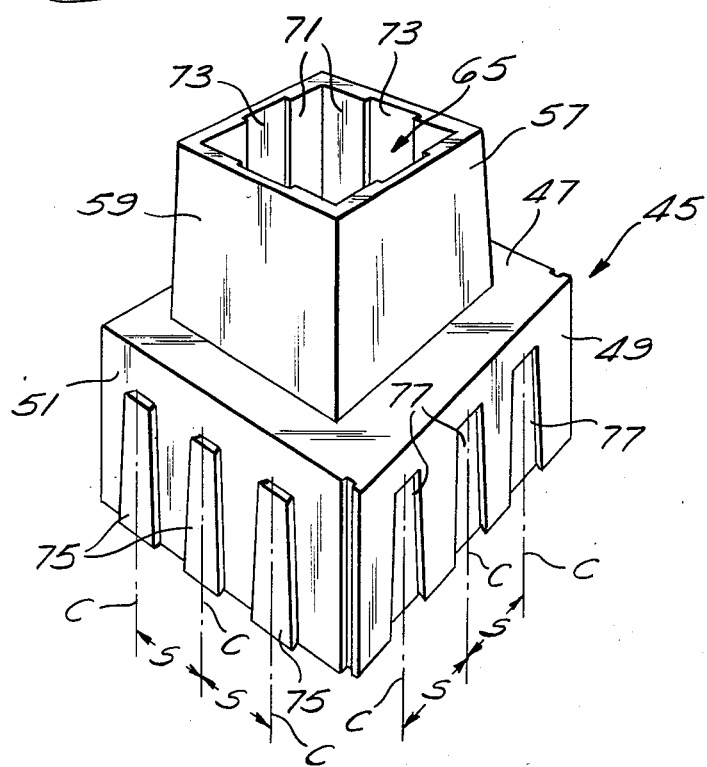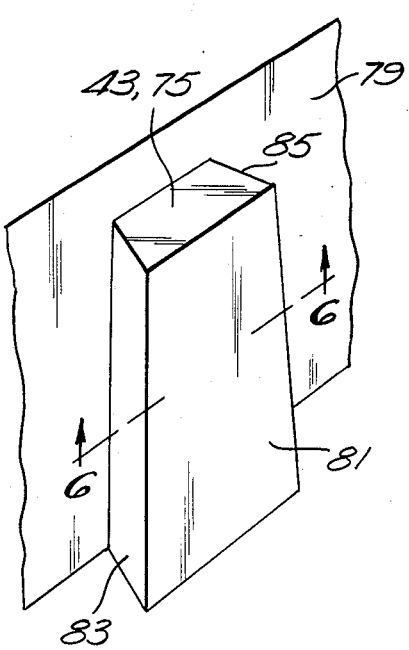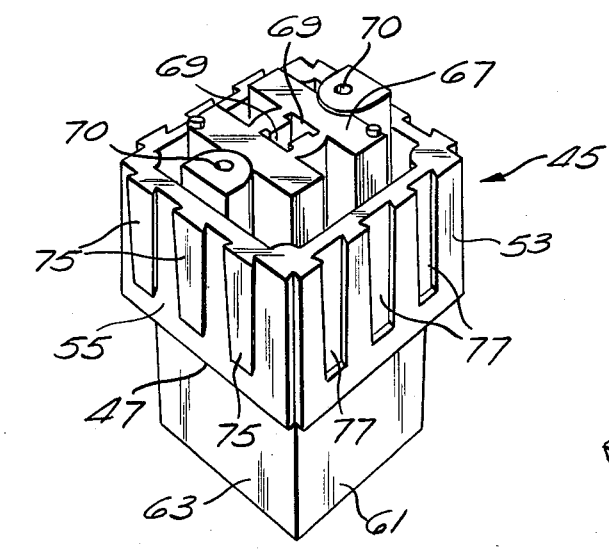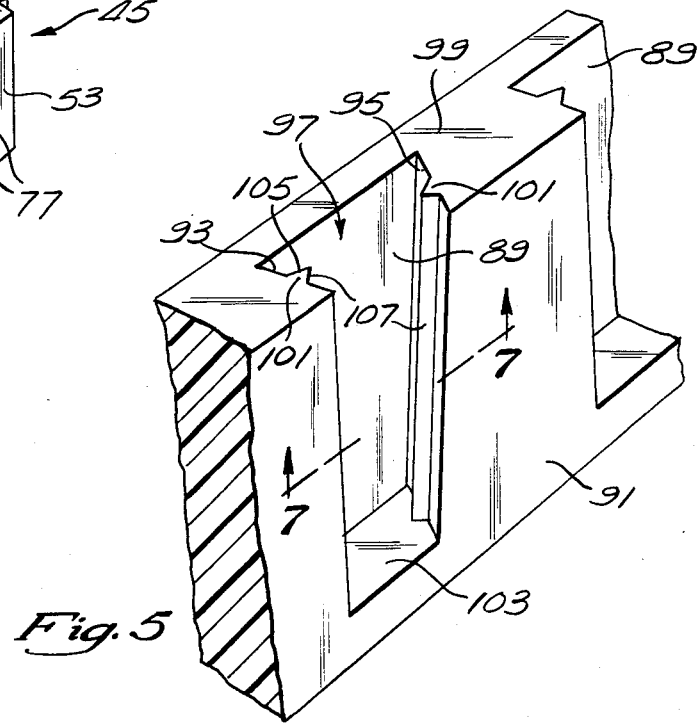

DOVETAIL BASE ASSEMBLY FOR KEYSWITCHES

This application is a continuation of application Ser. No. 379,961, filed May 19, 1982, now abandoned.

BACKGROUND OF THE INVENTION

In the rapidly growing computer industry, the keyboard of a computer terminal has become an element of concern because of its relatively high cost and the necessity of obtaining flexibility for the numerous applications in which it may be used. Keyboards generally comprise a structural base for housing and supporting the various elements of plural keyswitches. Each keyswitch includes a pair of contacts, a movable switch framework, and a biasing element which provides automatic separation of the contact upon release of the switch framework. The base in which the plural keyswitches are housed is typically a one-piece plastic molding having a plurality of individual receptacles for the plural keyswitch element. The keyswitch and base shown in U.S. Pat. No. 3,751,618 is typical of such installations, and that patent is hereby incorporated herein by reference. The structural base is manufactured, typically by a molding process which requires a unique die corresponding in shape to each different keyboard configuration. Because the structural base supports and guides the elements of the keyswitch, it includes intricate shapes, and thus the molding dies are expensive.

Because, in the prior art, the keyboard arrangement dictates the structural base configuration, keyboard designs must be carefully considered before a die is made. Once a structural base is designed and its die manufactured, it is very difficult and costly to change the keyboard configuration. Furthermore, it is highly impractical to modify keyboard structural bases which have already been manufactured. Thus, due to the difficulty of changing the structural base, the keyboard manufacturer is constrained, both from a design flexibility standpoint and with regard to modification of keyboard configurations after manufacture.

For these reasons, it would be advantageous to provide a structural base design which did not suffer from these inadequacies, and which could be produced at low cost.

SUMMARY OF INVENTION

Applicant's invention comprises a modular structural base assembly for constructing a custom keyswitch array. A foundation structural base module, having a conventional group of keyswitch locations, such as those of a typical typewriter keyboard, is provided as a basic building block upon which a desired keyboard configuration can be constructed. The periphery of the foundation module is provided with a plurality of coupling elements. Accessory base modules of various keyswitch groupings may be interlocked with the foundation module by corresponding coupling elements formed on the sides of each accessory module.

The coupling elements interconnect to attach the accessory base modules of a desired keyswitch grouping at a desired location around the periphery of the foundation module to permit the keyboard manufacturer to add accessory keys at virtually any location and in any desired plurality around the periphery of the foundation module.

In the preferred embodiment, coupling is accomplished by tongue-and-groove type couplers formed along the sides of each module. Each tongue or flange is preferably shaped in a dovetail configuration for engagement with a mating dovetail shaped groove or recess to interlock adjacent modules. Coupling elements are positioned to replicate and continue the outwardly accessible couplers on the outer periphery of a foundation module, and attached accessory modules, for engagement with additional accessory base modules.

Each tongue-and-groove type connector includes means for effectuating an interference fit upon engagement to securely interlock adjacent modules and provide dimensional stability among multiple interlocked modules. Assembled modules may be disassembled and reused to form alternate keyboard configurations when desired.

The modular structural base assembly provides custom keyboard manufacture through the use of standardized key base modules, thereby eliminating any need for custom built dies and tooling normally necessary for custom configurations. This allows great flexibility for keyboard designers and greatly reduced costs in keyboard manufacture. Thus, a manufacturer may offer designs without increased die costs and may offer future editions of selected key stations to an existing keyboard. The modular base configuration allows retro-fit of existing keyboard terminals with additional key stations, as the user requires, after any particular unit is assembled and put into use.

BRIEF DESCRIPTION OF THE DRAWINGS

FIG. 1 is a top plan view of a foundation base module having 47 key stations integrally formed in a unitary structure;

FIG. 2 is a top, front perspective view of a single key station base module;

FIG. 3 is a bottom, rear perspective view of the single key base module of FIG. 2;

FIG. 4 is an enlarged, perspective view of an interlocking dovetail flange, as shown in FIGS. 1-3;

FIG. 5 is an enlarged, broken-away perspective view of a dovetail recess with a crushed rib, as shown in FIGS. 2 and 3;

DETAILED DESCRIPTION OF THE INVENTION

Figure 6:
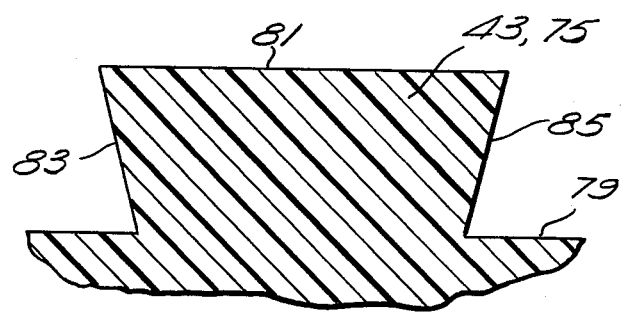
FIG. 6 is a section view of a dovetail flange taken along line 6—6 of FIG. 4.

The preferred embodiment of the modular structural base assembly for constructing a keyboard array is shown in FIG. 1 in the form of a typical typewriter keyboard. It will be recognized that the keyboard array may take any desired form, such as a calculated keyboard, etc. A basic array of keyswitch stations for a keyboard panel is provided by foundation module 21. In this embodiment, the foundation module 21 comprises 47 individual key stations 23 formed as a unitary structural member. A first row 25 includes a single keyswitch station 27 positioned for attachment of a spacing bar as in a common typewriter. A second row 29 includes ten keyswitch stations equally spaced and positioned symmetrically in relation to the first keyswitch station 27. The third row 21 includes eleven keyswitch stations equally spaced, with all stations offset in relation to the keyswitch stations of the preceding second row 29 by a distance of one-half the width of an individual keyswitch unit.

A fourth row 33 of twelve equally spaced keyswitch stations is provided with each station offset to the left from the third row 31 of keyswitch stations by a distance of one-fourth the width of an individual keyswitch unit. Finally, a fifth row 35 of thirteen equally spaced keyswitch stations is included, offset from the preceding fourth row 33 by one-half the width of an individual keyswitch unit.

The peripheral sides 37 and 39 and peripheral rear 41 of the foundation module 21 include a plurality of male dovetail flanges 43 for coupling accessory base modules to the foundation module 21 to form a custom keyboard configuration. Various accessory structural base modules may be connected to the dovetail flanges 43 of the foundation module 21. The simplest example is a single keyswitch station, shown in FIGS. 2 and 3.

The array of keyswitch stations provided in the foundation module 21 is typical of a normal typewriter keyboard, including lateral offset spacing between adjacent rows of keys. As will be apparent from the following description, this offset spacing creates unique problems in designing coupling accessory modules which will couple with the foundation module 21 while maintaining proper spacing between adjacent rows.

The single keyswitch base module 45, shown in FIGS. 2 and 3, has a generally rectangular configuration, and includes a midwall 47 extending horizontally between four vertical side skirts 49, 51, 53, 55, which define the outer periphery of the base module 45. Four vertical central walls 57, 59, 61, 63, tower above the midwall 47 in generally perpendicular relation with the midwall 47 to form an interior cavity 65 opening upwardly to accept and support keyswitch components (not shown). The interior cavity 65 is closed by a floor 67 which includes openings 69 for positioning and holding switch contact terminals (not shown). The floor 67 is substantially below the lower edge of the skirts 49-55 to allow easy cleaning of residue remaining after soldering operations used to connect the keyswitch terminals with a printed circuit board. Small bores 70 are also provided in the floor 67 for engagement of a fastener.

The interior surface 71 of each central wall 57-63 within the cavity 65 is provided with a groove 73 for slidably mounting a key frame (not shown) within the cavity 65 for operation of the switch contact set. The module 45 may be connected to a printed circuit board, with fasteners attached between the board and the bores 70, and with electrical connectors made through the opening 69.

The periphery of the skirts 51 and 55 include dovetail shaped tongues or flanges 75. Similarly, dovetail shaped grooves or recesses 77 are formed in the remaining skirts 49 and 53. The dovetail flanges 75 on the base 45 are identical to the dovetail flanges 43 on the foundation module 21 (of FIG. 1). Thus, the dovetail flanges 75 and recesses 77 are provided to couple adjacent base modules and rigidly constrain them to provide a custom-configured assembly.

Each dovetail flange 43, 75, is shaped to slidingly engage a mating dovetail recess 77 so that coupling of adjacent modules can be accomplished. The detailed shape of the dovetail coupling elements 43, 75, and 77 is shown in FIGS. 4-7.

First with reference to FIGS. 4 and 6, a male dovetail flange 43, 75, is shown protruding from the surface 79 of either the skirt 51 or 55 (of FIGS. 2 and 3) of a single keyswitch base module 45, or of the periphery of the foundation module 21 (of FIG. 1). A raised surface 81 is provided that is spaced from and parallel to the surface 79. A pair of side walls 83 and 85 extend between the raised surface 81 and the surface 79. The side walls 83 and 85 form an acute angle with both the surface 79 and the raised surface 81. Thus, as shown in FIG. 6, the flange 43, 75, is trapezoidal in section. The raised surface 81 is also trapezoidal, such that the side walls 83 and 85 are closer to one another at the upper end of the flange 43, 75, than at the lower end thereof. This shape permits a loose fit of the flange 43, 75 within a dovetail recess 77 when recess 77 is initially positioned over the top of the flange 43, 75, and a tight fit as the dovetail recess 77 is moved downwardly over the flange 43, 75.

Figure 7:
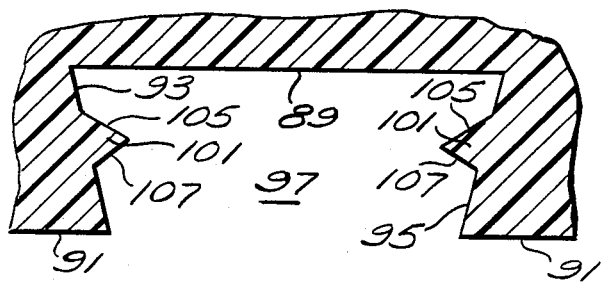
FIG. 7 is a section view of a dovetail recess with a crushed rib, taken along line 7—7 of FIG. 5.

The female dovetail recess 77 which is formed in the skirts 49, 53 of the base module 45, is shown in FIGS. 5 and 7. A recessed wall 89 is parallel to and spaced from the surface 41 of the skirt 49, 53 at the periphery of the base module 45. A pair of side walls 93 and 95 extend between the skirt surface 91 and a recessed wall 89. The side walls 93, 95 form an acute angle with both the surface 91 and a recessed surface 89. Thus, as shown in FIG. 7, the dovetail recess 77 is trapezoidal in section. The recessed surface 89 is also trapezoidal, such that the side walls 93, 95 are closer to one another at the lower end of recess 77 than at the upper end thereof. The walls 93 and 95 provide a bearing surface facing substantially inwardly toward the interior of recess 77 to restrain lateral movement of adjacent modules when they are interconnected. The recessed wall 89 and side walls 93 and 95 form a dovetail shaped opening 97 in the bottom edge 99 of the skirts 49, 53, to accept a mating dovetail flange 43, 75.

Each side wall 93 and 95 is provided with a crush rib 101 protruding from its surface and extending along its length from the edge 99 of the skirt 49, 53 to an end wall 103 at the opposing end of the dovetail recess 77. Crush rib 101 provides an interference fit with a mating dovetail flange 43, 75 within the dovetail recess 77 when the flange 43, 75 is fully engaged within the dovetail recess 77.

The crush rib 101 is preferably of triangular cross-sectional shape, with sides 105, 107 lying in planes which converge at a 60° angle to form a ridge raised approximately 0.010 inches above the side wall 93, 95 of the recess 77, and positioned outwardly from the recessed wall 89 by a distance three-fourths of the width of the side wall 93, 95.

Figure 8:
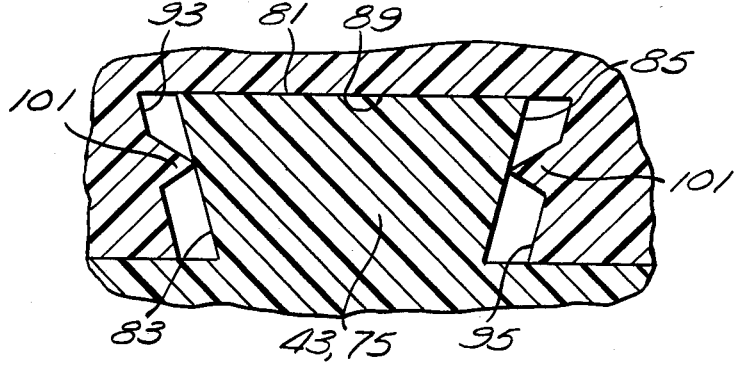
FIG. 8 is a section view of a dovetail flange inserted into a dovetail recess to a position in which interference contact with a crushed rib begins.
Figure 9:
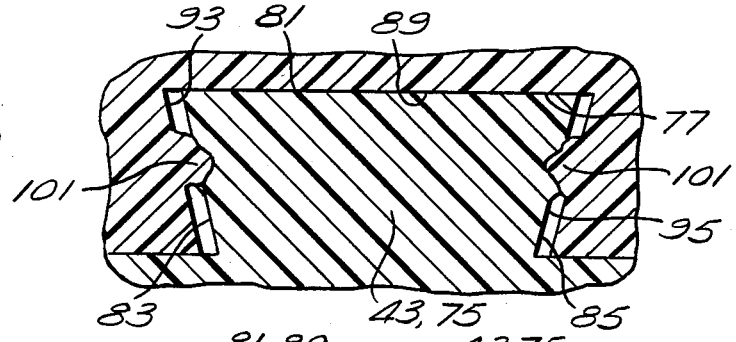
FIG. 9 is a section view of a dovetail recess and a dovetail flange depicting deformation of a crushed rib during sliding engagement.
Figure 10:
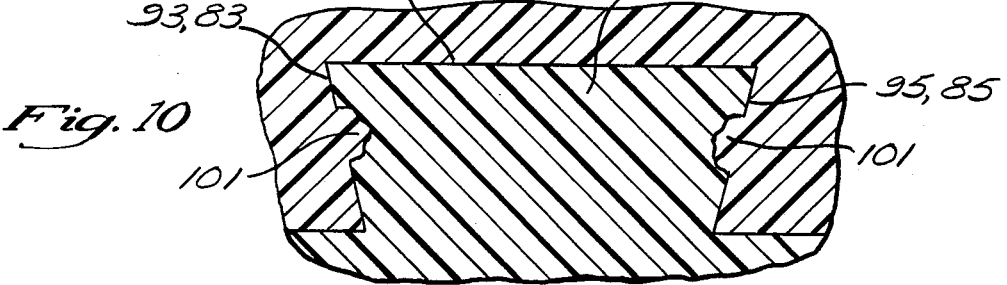
FIG. 10 is a section view of a dovetail recess and a dovetail flange depicting complete interlocking engagement with a completely deformed crushed rib.

The action of the crush rib in providing an interference fit between mated dovetail elements 43, 75, and 77 is shown in FIGS. 8–10. These figures are taken along line 7—7 of FIG. 5 as the flange 77 of recesses 43, 75 is moved downwardly over the mating flange 43, 75. First, FIG. 8 shows the dovetail flange 43, 75 just engaging with the crush ribs 101 protruding from the walls 93, 95 of the dovetail recess 77. As force is applied to further slide the dovetail flange 43, 75 within the dovetail recess 77, the crush ribs 101 are deformed and peened over as shown in FIG. 9, engaging and indenting the side walls 83, 85 of the dovetail flange 43, 75. When the dovetail flange 43, 75 is fully engaged within its mating recess 77, the crush ribs 101 are maximally deformed and further indent the side wall 83, 85 of the dovetail flange 43, 75 to provide a strong frictional bond therebetween, as shown in FIG. 10. This interference fit between dovetail flange 43, 75 and the dovetail recess 77 forces the raised surface 81 of the dovetail flange 43, 75 against the recessed wall 89 of the dovetail recess 77.

The use of crush ribs 101 to provide an interference fit between dovetail coupling elements 43, 75, 77, allows a wider range of dimensional tolerance in manufacture of the base modules.

Mating shapes of a dovetail recess 77 and the dovetail flange 43, 75 provide a secure fit when fully slidingly engaged. In this configuration, the side walls 83 and 85 of the dovetail flange 43, 75 are unable to disengage the side walls 93 and 95 of the dovetail recess 77 in response to the application of lateral force between coupled base modules. Only sliding movement, of substantial force, in a direction opposite to insertion, will allow uncoupling of such base modules.

Foundation base module 21, shown in FIG. 1, is provided with male dovetail flanges 43 along its periphery so that accessory base modules such as the single keyswitch base module of FIGS. 2 and 3 may be easily coupled to it by downwardly sliding dovetail recesses 77 of an accessory base module over the dovetail flanges 43. This modular arrangement provides adaptability in allowing engagement of an accessory module to the assembled keyboard, even after a printed circuit board had been permanently attached, thereby allowing addition of accessory base modules to completely assembled keyboards. The rigidly coupled base modules maintain dimensional accuracy between key stations throughout the assembled keyboard through the interference fit of the dovetail coupling elements 43, 75 and 77.

Each accessory base module is provided with dovetail flanges 75 on two adjacent sides, and dovetail recesses 77 on the remaining two adjacent sides. Such a configuration is shown for the single keyswitch base module in FIGS. 2 and 3. This arrangement assures accessibility of male dovetail flanges 43, 75 on the outer periphery of a modular keyboard assembly.

Figure 11:
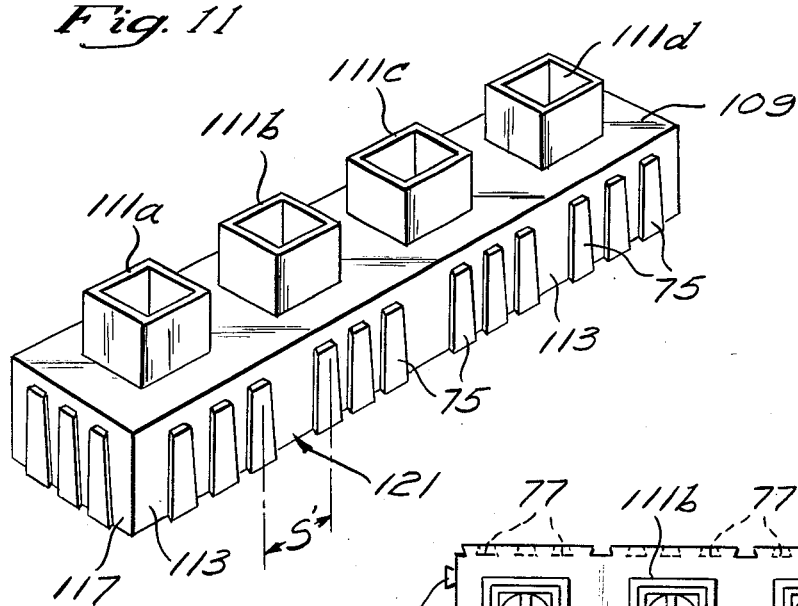
FIG. 11 is a perspective view of an in-line 4-key station base module.
Figure 12:
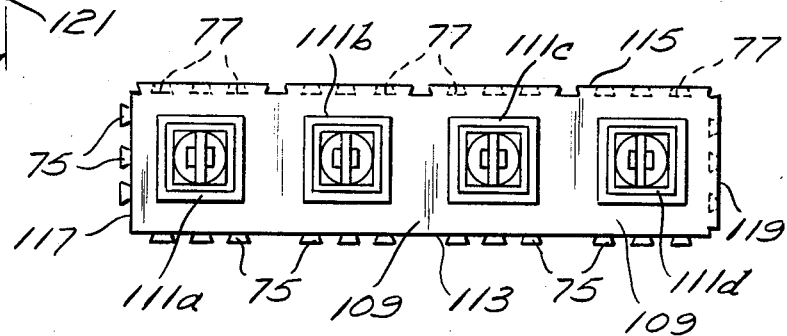
FIG. 12 is a top plan view of the module of FIG. 11.

It should be recognized that the accessory base modules may include any number of keyswitch stations. For example, as shown in FIGS. 11 and 12, a 4-keyswitch station accessory base module may be formed by providing a common horizontal midwall 109 connecting central walls 111a through 111d which form four aligned cavities for receiving keyswitch elements. An elongate skirt 113 depends from one side of the midwall 109 and includes plural dovetail flanges 75. An opposite extended skirt 115, also depending from the midwall 109, includes plural dovetail recesses 77. The skirts 117 and 119 at the narrow ends of the module are identical to the skirts 51 and 53 of the single keyswitch module of FIGS. 2 and 3.

With reference to FIGS. 2, 3, 11 and 12, regardless of the number of keyswitch stations included in a base module, plural dovetail flanges 75 and plural dovetail recesses 77 are formed on the surface of the skirt 49–55, 113–119 of each keyswitch section of a base module. It is preferred that three such coupling elements be formed in spaced relation along the skirt periphery for each key station section. In the preferred embodiment, each such section is three-quarters of an inch wide. Preferably, the spacing S between adjacent central axis C of the flange 75 or recesses 77 is three-sixteenth of an inch.

Between adjacent key station sections, a gap 121 is formed. The gap 121 provides a dimension S' between the central axis of adjacent flanges 75 or recesses 77 which equals twice the dimension S. This results in triple groupings of flanges 75 or recesses 77. The width of the enlarged spacing S' in the preferred embodiment is three-eighths of an inch.

This grouping of coupling elements assures that a dovetail connection will not be made at a parting line between adjacent base modules when the modules are aligned with one another, which would tend to force such modules apart at the parting line.

The combination of three flanges 75 and recesses 77 for each key station along the sides of a base module, spaced by three-sixteenths of an inch, allows assembly of adjacent modules in offset relations of one-fourth, one-half or three-fourths of the width of a key station section. This advantageously allows keyboard configurations to be assembled which provide spacing between alternate rows of key stations corresponding to that of a typical typewriter keyboard.

Figure 13:
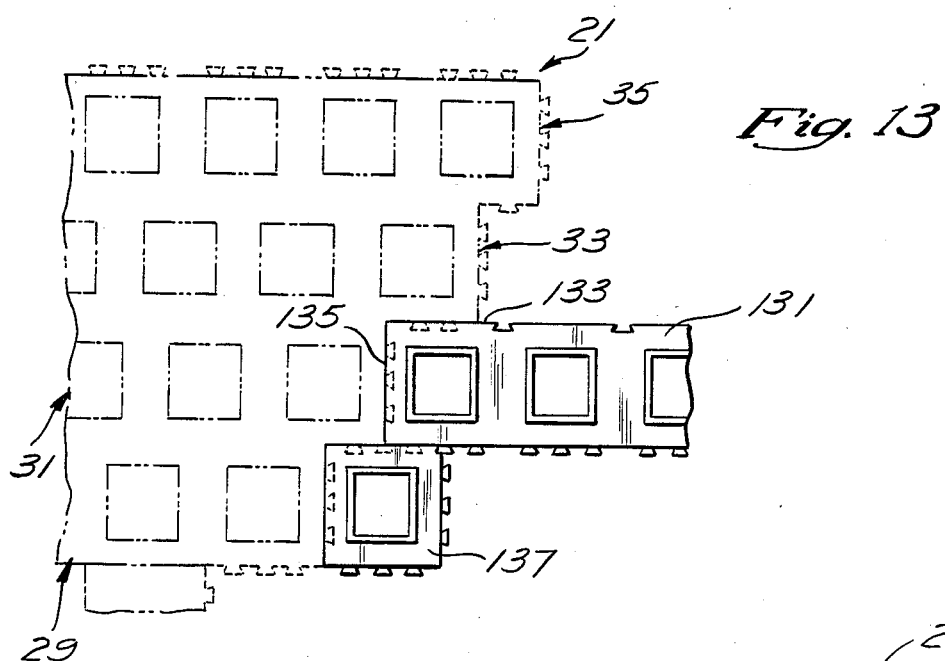
FIG. 13 is a top plan view of an accessory base module fitted to the second and third rows of a foundation module.
Figure 14:
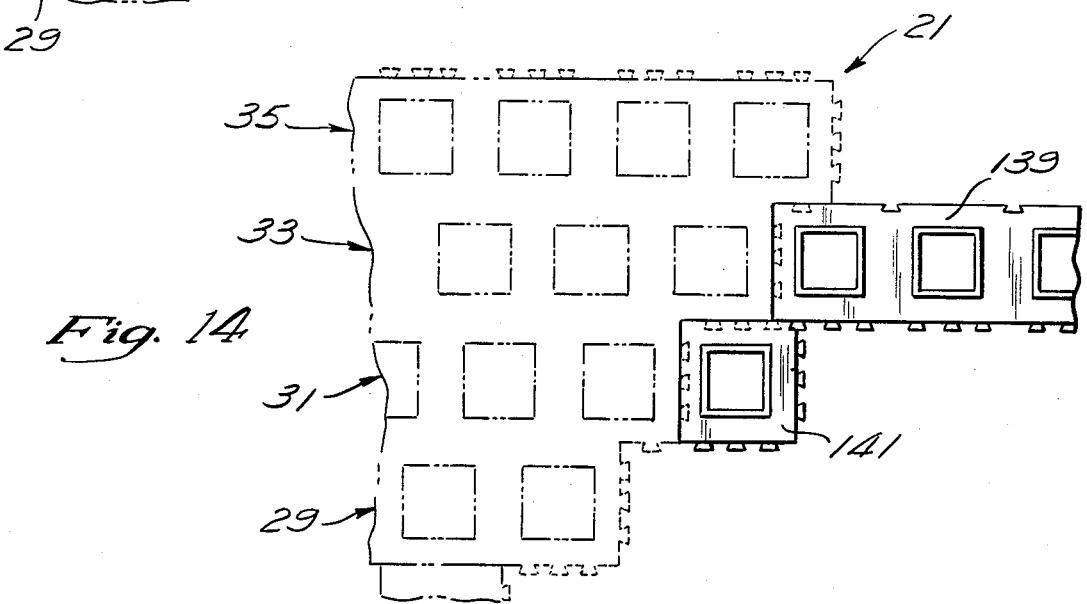
FIG. 14 is a top plan view of an accessory module fitted to the third and fourth row of a foundation base module.
Figure 15:
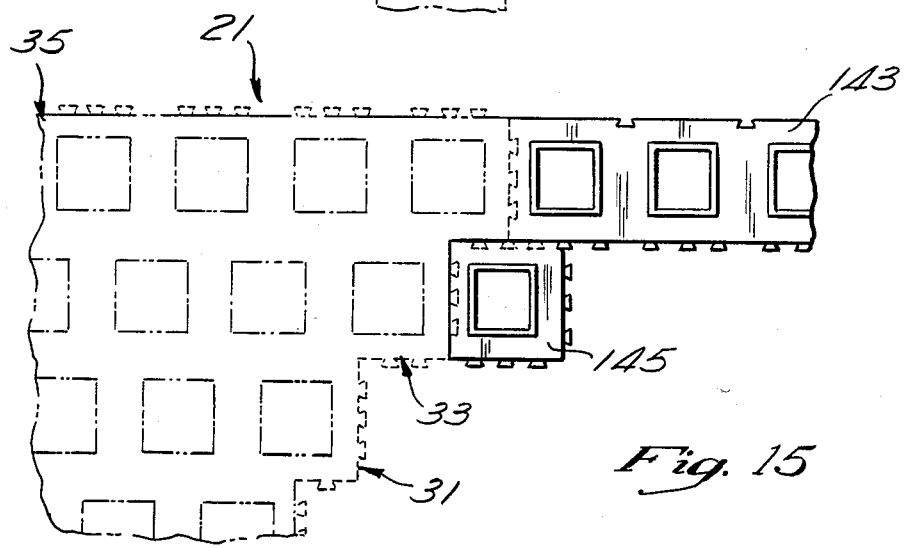
FIG. 15 is a top plan view of an accessory module fitted to the fourth and fifth rows of a foundation module.

Thus, referring to FIGS. 13–15, the advantageous positioning of the dovetail flanges 75 and recesses 77 along the periphery of the keyswitch base module can be seen. FIG. 13 shows a foundation module 21 to which multiple station accessory module 131 has been attached as an extention of the third row 31, with the dovetail flanges 43 of the foundation module 21 engaged within the dovetail recesses 77 in the multiple station accessory module 131 on the top 133 and left 135 sides. This connection allows a continuation of the one-quarter offset between the third and fourth rows 31, 33 of the foundation module 21. A second accessory base module 137 can be coupled to the assembled modular base, maintaining the one-half offset relation between the second row 29 of the foundation module and the third row 31 of the foundation module.

Similarly, as shown in FIG. 14, a foundation module 21 is shown having multiple station accessory module 139 coupled as an extension of the fourth row 33 of key stations. This connection allows continuation of the one-half offset between the fourth 33 and fifth 35 rows of the foundation module 21. A second accessory module 141 can be added to the assembly along the third row 31 of the foundation module 21, maintaining the one-fourth offset between the third 31 and fourth 33 rows. Further, with reference to FIG. 13, where an accessory module 143 has been coupled to a foundation module 21 adjacent to the fifth or top row 35, a second accessory module 145 may be coupled adjacent to the fourth row 33 of the foundation module 21, maintaining the one-half offset relation between these rows.

Referring to FIG. 3, the opening 69 provided in the floor 67 of each key station through which a pair of terminals will protrude when the switch is assembled, are separated from one another in a direction parallel to the skirt 53. It is important in the assembly of a modular keyboard to maintain alignment of the switch terminals so that a printed circuit board may be easily fabricated to connect these terminals, providing identically patterned receptacles for the keyswitch contacts.

Figure 16:
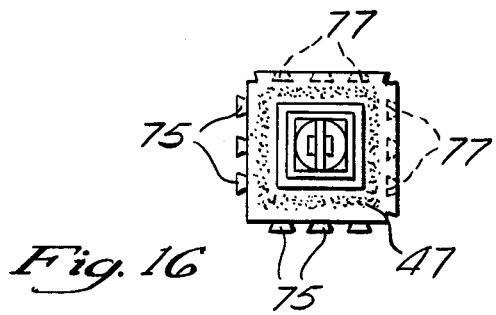
FIG. 16 is a top plan view of a lefthand, single key station base module.
Figure 17:
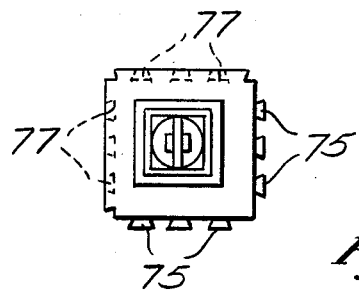
FIG. 17 is a top plan view of a righthand, single key station base module.

In order to provide proper mating relationship of the dovetail recesses 77 on two adjacent sides of an accessory module with the dovetail flanges 43 on the side of the foundation module 21, while maintaining alignment of the terminals protruding from the floor 67, it is necessary to have righthand and lefthand configurations for each type of accessory module, as depicted for a single keyswitch base module in FIGS. 16 and 17. As shown in FIG. 16, dovetail flanges 75 are provided on a lefthand and bottom skirts of a lefthand keyswitch module, while dovetail recesses 77 are provided in the top and righthand skirts, when viewed from above. This lefthand module is identified by marking on the midwall 47. FIG. 17 depicts a righthand single keyswitch base module, which has dovetail flanges 75 extending from the bottom and righthand skirts, while dovetail recesses 77 are formed in the upper and lefthand skirts, viewed from above. By proper use of these base modules, proper alignment of the terminals extending through the opening 69 can be maintained.

Thus it will be apparent by inspection of FIG. 1 that if a particular single keyswitch base module were first interconnected to the flanges 43 at the righthand side of the fifth row 35 and were then transferred to the upper flanges 77 on the righthand key station of this same row, the single keyswitch base module would have to be rotated through 90°. Such rotation would alter the orientation of the terminals extending from opening 69.

Figure 18:
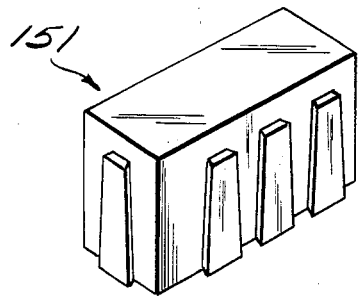
FIG. 18 is a perspective view of a spacer module.

Many times, it is advantageous to provide a keyboard with keys with a substantially wider configuration than those normally used. In these instances, it is necessary to space a key station an extra distance from the adjacent station to allow the insertion of an enlarged key. In this modular base assembly, this is accomplished by inserting a spacer 151 as shown in FIG. 18, to space an accessory base module a proper distance. Spacers may be provided in width corresponding to one-fourth, one-half and three-fourths of a typical key station unit width.

Figure 19:
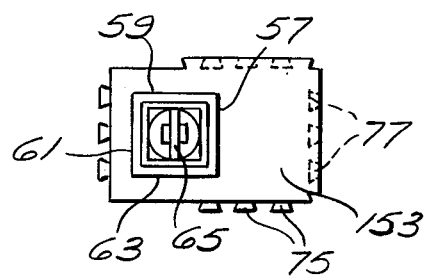
FIG. 19 is a top plan view of a single key station base module, including an integral spacing element.

However, occasionally a key station spacing other than the one-fourth multiple spacing may be desired. Such spacing is provided by special key station base modules 153 which integrally incorporate proper spacing, as shown in FIG. 19. When assembled, these special modules 153 position a key station formed therein in any selected location without interrupting assembly and spacing of following accessory base modules. Typically, the outward dimensions of special base module 153 are similar to a normal accessory base module, with the towering central walls 57–63 defining an offset keyswitch cavity 65 to accommodate the required key configuration.

What is claimed is:

1. A modular base assembly for constructing a keyswitch array, comprising:
    a foundation base module having a plurality of receptacles for receiving and supporting keyswitch elements, said receptacles grouped to form a standard typewriter key matrix;
    plural accessory base modules, each having at least one receptacle for receiving and supporting keyswitch elements;
    coupling means, comprising a flange and a recess, for coupling said accessory base modules to said foundation base module to form said keyswitch array, said coupling means including first and second contact surfaces, said first surface comprising a crush rib disposed on the sidewalls of said recess, said crush rib being adapted to deform when said base modules are coupled by engagement of said first and second contact surfaces, said second surface being more rigid than said first surface and adapted to tightly engage said first surface to provide interfering engagement between said flange and recess and to restrict movement between said flange and said recess.

2. A modular base assembly of claim 1 wherein said crush rib has a triangular shape with sides lying in planes which converge at a 60° angle.

3. The modular base assembly of claim 1 wherein said coupling means comprises at least one dovetail shaped flange protruding from each of two sides of each base module and at least one dovetail shaped recess formed in each of two remaining sides of each base module.

4. A modular base assembly of claim 3 wherein said dovetail shaped flange has a substantially trapezoidal shaped cross-section.

5. A modular base assembly of claim 3 wherein said dovetail shaped flange defines a trapezoidal shaped surface.

6. A modular base assembly of claim 3 wherein said dovetail shaped recess has a substantially trapezoidal shaped cross-section.

7. A modular base assembly of claim 3 wherein said dovetail shape recess defines an opening having a trapezoidal shaped area.

8. A modular base assembly of claim 3 wherein said dovetail recess is slidingly engaged over said dovetail flange to couple adjacent base modules.

9. A modular assembly for constructing a keyswitch station array comprising:
    a plurality of modules each having at least one keyswitch receptacle;
    a plurality of vertically tapered flanges on at least one surface of each module;
    a plurality of vertically tapered recesses on at least one surface of each module, said recesses having an open end for receipt of said flanges, said recesses further including a crush rib disposed substantially along the vertical length of each side wall of the recess, said crush rib being deformable upon sliding engagement of the flange so as to ensure rigid mating of said vertically tapered recess and said vertically tapered flange.

10. The assembly as recited in claim 9 wherein said recesses and said flanges have a dovetail configuration.

11. The assembly as recited in claim 10 wherein said module includes first and second surfaces, each having three of said flanges disposed thereon, and third and fourth surfaces, each having three of said recesses disposed thereon.

12. The assembly as recited in claim 10 wherein the crush ribs frictionally interlock said flange and said recess.

13. The assembly as recited in claim 12 wherein said frictional interlock is distributed along the length of said crush ribs.

14. A modular assembly for constructing a keyswitch array, comprising:
 a plurality of modules each having at least one keyswitch receptacle; and
 coupling means, comprising a flange and recess, for coupling pairs of said plural modules together to form said assembly, said flange including first and second contact surfaces, said recess including third and fourth contact surfaces for slideably engaging said first and second contact surfaces, respectively, said first and third contact surfaces adapted for deformable contact and said second and fourth contact surfaces adapted for rigid contact, said flange and recess correspondingly tapered to permit said flange to be partially inserted into said recess without deformation of said first and third contact surfaces, said first and third contact surfaces configured to deformably cooperate to increasingly bias said second and fourth rigidly contacting surfaces into increasingly tighter engagement as said first and third surfaces and said second and fourth surfaces slideably engage each other during further insertion of said flange into said recess, thereby accurately locating said pairs of said plural modules.

* * * * *